O. W. DOLPH.
MEASURING INSTRUMENT.
APPLICATION FILED APR. 11, 1908.
940,439.
Patented Nov. 16, 1909.
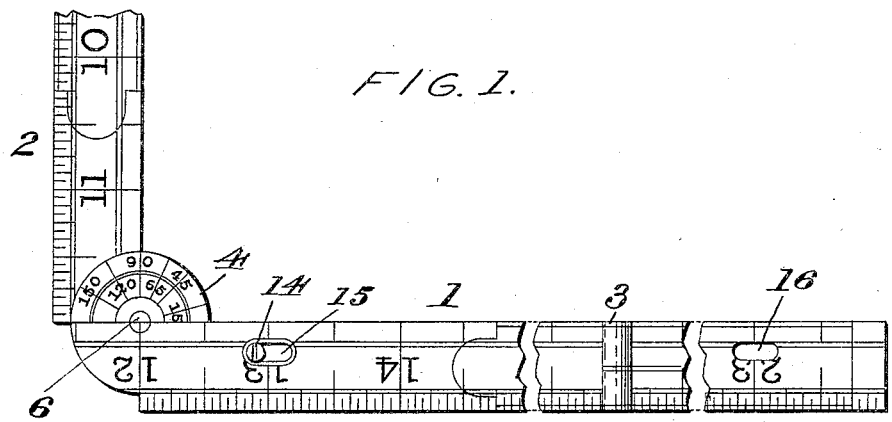
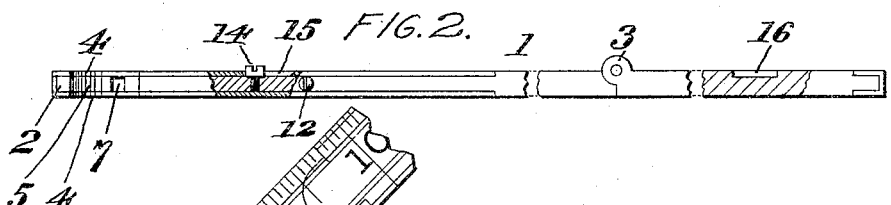
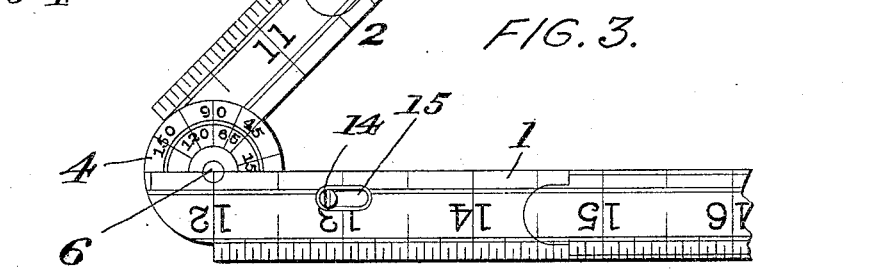
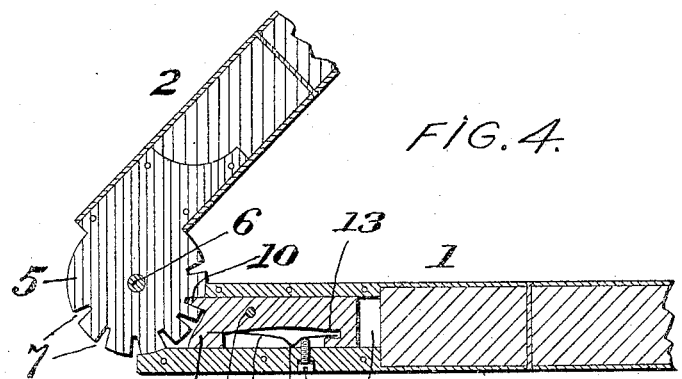
Witnesses:
William Schuchardt
Norma Keiser.
Inventor:
Otto W. Dolph,
by John Elias Jones,
Attorney.

UNITED STATES PATENT OFFICE.

OTTO W. DOLPH, OF CINCINNATI, OHIO.

MEASURING INSTRUMENT.

940,439.  Specification of Letters Patent.  Patented Nov. 16, 1909.

Application filed April 11, 1908. Serial No. 426,554.

*To all whom it may concern:*

Be it known that I, OTTO W. DOLPH, a citizen of the United States of America, and a resident of Cincinnati, in the county of Hamilton and State of Ohio, have invented certain new and useful Improvements in Measuring Instruments, of which the following is a specification.

This invention relates to measuring-instruments and more especially to those known as combination-rules in which linear, rectilinear and circular measurements are possible in the use thereof, and the object of the invention is to provide a folding-rule with a joint-disk having graduations or index-lines thereon whereby the degrees of angles to which the several members or legs of the rule are set apart in pivoting them to each other and, also, to provide improved adjustable means by which said members or legs of the rule are retained to the desired angle.

The invention consists in a measuring-instrument comprising a rule having a pair of members or legs, a disk joint having graduations or index-lines thereon and pivotally-connecting said members or legs at indicated or known angles and means, comprising a toothed or notched inner disk at the hinge end of one of said members and an adjustable bolt or sliding bar having a projection at its fore end adapted to engage the said toothed or notched inner disk and mounted under spring tension in the hinge end of the other member or leg, whereby the two hinged members or legs of the rule may be locked or retained to the desired angle within the scope of the said graduated or indexed disk joint, or in linear or rectilinear position.

Other features of the invention will be fully hereinafter described and particularly pointed out in the claim.

In the accompanying sheet of drawings, forming a part hereof, Figure 1 is a fragmentary, inner plan view of the combination-rule embodying my invention, the two members or legs of the instrument being set apart at right-angles for use as a try-square in rectilinear work; Fig. 2, a longitudinal elevation taken along the fore edge of Fig. 1, but showing several parts broken open and in section to indicate more clearly some of the otherwise hidden features of the invention herein; Fig. 3, a fragmentary view similar to Fig. 1, but with the left leg or member set at an angle of forty-five degrees instead of in the try-square or rectilinear position seen in Fig. 1; and Fig. 4, a horizontal section of the device in the position seen in Fig. 3, the line of section being about mid-thickness of the rule and showing the internal construction of the locking means for retaining the two pivotal leg-members of the rule to the desired angle.

In these views, 1 indicates one of the rule members or legs and 2, the other rule member, both graduated as customary and having folding-hinges 3. The usual disk joint is provided between the two adjacent inner ends of the rule members 1 and 2, such disk joint being made up of thin outer disk plates or parts 4, 4, of two hundred and seventy degrees graduated-arc surface and an inner thicker or heavier disk part 5 of a like graduated-arc surface and a central pivot-pin 6. The outer faces of both the outer disks 4 have graduated or index lines suitably made thereon and covering approximately two-thirds of their arc surfaces beginning at the inner edge of the leg or member 1, the inner edge of the other member 2 being used as a gage in connection with the graduations to indicate the degree to which the member or leg 2 is set at an angle on the pivot 6 away from the member or leg 1.

7 indicates each one of a series of radial notches or indentations made in the peripheral edge of the inner disk 5 of the rule hinge, each notch coinciding with a graduation line on the outer face of each disk 4, and 8 indicates a sliding plate or bar, comprising a bolt within the chamber 9 constructed at the hinge end of the member or leg 1, as best seen in Fig. 4.

10 indicates a tongue or projection constructed at the upper fore corner of the bolt 8 and adapted to engage the respective notches 7 in the disk 5 when it is desired to hold or retain the member or leg 2 at the desired angled-relation to the leg 1. In Fig. 4, I have shown the bolt in engagement with a notch 7 for retaining the leg 2 at an angle of forty-five degrees to the leg 1, a spring 11 being carried by the bolt and having a projecting portion 11$^a$ that engages a screw-stop 12 to ordinarily hold said bolt against backward movement from engagement with the notched edge of the disk 5. It will be seen, in Fig. 4, that the spring 11 is rigidly secured at one end in a recessed portion of the bolt and has its other end free to play between the walls of a notch 13 and thus make due allowance for the riding of the elevated portion 11ª of the spring over the screw-stop 12 when sliding the bolt to and from locking position. The screw-stop 12 is inserted from the edge of the rule leg 1 so that its inner end projects into the spring-chamber of the bolt and the engagement of the raised portion 11ª of the spring 11 at either side of the screw-stop prevents any accidental sliding of the bolt into or from locking position. Thus, when the rule is to be used with both limbs or legs free to pivot, especially for linear or straight measurement, the bolt will be held back by the spring without danger of its locking end 10 coming into contact with the notched edge of the disk 5 for any unnecessary or injurious purpose.

14 indicates a screw whose shank is held in the bolt 8 and whose head is adapted to travel in the slot 15 made in the inner face of the leg 1, said head of the screw projecting slightly beyond the slot 15 whereby it can be engaged by the thumb in sliding the bolt to and from locking position. A recess or socket 16 is provided near the outer end of the leg 1 for accommodating or seating the projecting head of the screw 14 when the rule is in folded position.

I claim:—

A measuring-instrument comprising a pair of leg-members, a disk joint having three disk parts, the two outer parts having protractor or degree lines or marks thereon and the inner disk part having radial notches along its peripheral edge to coincide with said degree marks, a locking-bolt having a projection at its fore end adapted to engage each of said notches, a spring carried by said bolt and a projection in the bolt chamber or guide-way adapted to be engaged by said spring for retaining the bolt in locked or unlocked position.

OTTO W. DOLPH.

Witnesses:
WILLIAM SCHUCHARDT,
JOHN ELIAS JONES.